United States Patent
Liatard et al.

(10) Patent No.: US 10,090,555 B2
(45) Date of Patent: Oct. 2, 2018

(54) POSITIVE ELECTRODE FOR LITHIUM-SULFUR ELECTROCHEMICAL ACCUMULATOR HAVING A SPECIFIC STRUCTURE

(71) Applicant: COMMISSARIAT A L'ENERGIE ATOMIQUE ET AUX ENERGIES ALTERNATIVES, Paris (FR)

(72) Inventors: Sebastien Liatard, Grenoble (FR); Celine Barchasz, Fontaine (FR); Jean Dijon, Champagnier (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 216 days.

(21) Appl. No.: 15/119,615

(22) PCT Filed: Feb. 20, 2015

(86) PCT No.: PCT/EP2015/053650
§ 371 (c)(1),
(2) Date: Aug. 17, 2016

(87) PCT Pub. No.: WO2015/124743
PCT Pub. Date: Aug. 27, 2015

(65) Prior Publication Data
US 2017/0062870 A1 Mar. 2, 2017

(30) Foreign Application Priority Data
Feb. 21, 2014 (FR) .................... 14 51407

(51) Int. Cl.
*H01M 10/052* (2010.01)
*H01M 10/0525* (2010.01)
(Continued)

(52) U.S. Cl.
CPC ....... *H01M 10/0525* (2013.01); *H01M 4/136* (2013.01); *H01M 4/1397* (2013.01);
(Continued)

(58) Field of Classification Search
CPC .................. H01M 10/052; H01M 10/0525
See application file for complete search history.

(56) References Cited

U.S. PATENT DOCUMENTS

| 2010/0178564 A1 | 7/2010 | Asari et al. |
| 2011/0091773 A1 | 4/2011 | Wei |

(Continued)

FOREIGN PATENT DOCUMENTS

| FR | 2 979 755 A1 | 3/2013 |
| WO | 2011/045466 A1 | 4/2011 |

OTHER PUBLICATIONS

Susanne Dorfler, et al., "High capacity vertical aligned carbon nanotube/sulfur composite cathodes for lithium-sulfur batteries", Chemical Communication, vol. 48, No. 34, pp. 4097-4099, (2012).
(Continued)

*Primary Examiner* — Olatunji Godo
(74) *Attorney, Agent, or Firm* — Oblon, McClelland, Maier & Neustadt, L.L.P.

(57) ABSTRACT

The invention relates to a positive electrode for a lithium-sulfur electrochemical accumulator comprising an electrically conductive substrate selectively coated, over at least one of its faces, with carbon nanotubes so as to create a zone coated with carbon nanotubes within which a plurality of separate zones without carbon nanotubes are arranged, these separate zones being qualified as empty.

14 Claims, 2 Drawing Sheets

(51) Int. Cl.
*H01M 4/136* (2010.01)
*H01M 4/1397* (2010.01)
*H01M 4/38* (2006.01)
*H01M 4/58* (2010.01)
*H01M 4/62* (2006.01)
*H01M 4/66* (2006.01)
*H01M 4/70* (2006.01)
*H01M 10/0568* (2010.01)
*H01M 10/0569* (2010.01)
*H01M 4/02* (2006.01)

(52) U.S. Cl.
CPC ........... *H01M 4/38* (2013.01); *H01M 4/5815* (2013.01); *H01M 4/625* (2013.01); *H01M 4/661* (2013.01); *H01M 4/663* (2013.01); *H01M 4/665* (2013.01); *H01M 4/70* (2013.01); *H01M 10/052* (2013.01); *H01M 10/0568* (2013.01); *H01M 10/0569* (2013.01); *H01M 2004/028* (2013.01)

(56) References Cited

U.S. PATENT DOCUMENTS

2011/0183206 A1 7/2011 Davis et al.
2011/0262807 A1 10/2011 Boren et al.

OTHER PUBLICATIONS

International Search Report dated Jun. 9, 2015 in PCT/EP15/053650 Filed Feb. 20, 2015.
French Search Report dated Dec. 11, 2014 in French Application No. 14 51 407 Filed Feb. 21, 2014.

POSITIVE ELECTRODE FOR LITHIUM-SULFUR ELECTROCHEMICAL ACCUMULATOR HAVING A SPECIFIC STRUCTURE

TECHNICAL FIELD

The present invention relates to a positive electrode for a lithium-sulfur electrochemical accumulator, said positive electrode having a particular geometry that makes it possible, during the operation of the accumulator, to optimize the contact between the positive electrode, the electrolyte and the active material, so as to obtain good results in terms of discharge capacity. The present invention also relates to a lithium-sulfur electrochemical accumulator comprising such a positive electrode and a method for preparing such a positive electrode.

The general field of the invention may thus be defined as that of energy storage devices, in particular that of electrochemical accumulators using lithium, and more particularly, lithium-sulfur.

BACKGROUND OF THE INVENTION

Energy storage devices are traditionally electrochemical accumulators operating on the principle of electrochemical cells able to deliver an electric current owing to the presence, in each of them, of a pair of electrodes (a positive electrode and a negative electrode, respectively) separated by an electrolyte, the electrodes comprising specific materials able to react according to an oxydoreduction reaction, in return for which electrons are produced at the source of the electric current and ions are produced that will circulate from one electrode to another through an electrolyte.

The accumulators adhering to this principle that are currently the most used are:
  Ni-MH accumulators using metal hydride and nickel oxyhydroxide as electrode materials;
  Ni—Cd accumulators using cadmium and nickel oxyhydroxide as electrode materials;
  Acid-Lead accumulators using lead and lead oxide $PbO_2$ as electrode materials; and
  lithium accumulators, such as lithium-ion accumulators, traditionally using, in whole or in part, lithium-bearing materials as electrode materials.

Because lithium is a particularly light solid element having the lowest electrochemical potential, thereby allowing access to an interesting specific energy density, lithium accumulators have greatly supplanted the other aforementioned accumulators due to the continuous improvement in the performance of Li-ion accumulators in terms of energy density. Indeed, lithium-ion accumulators make it possible to obtain specific and volume energy densities (which may be greater than 180 Wh·kg$^{-1}$) significantly greater than those of Ni-MH and Ni—Cd accumulators (which may go from 50 and 100 Wh·kg$^{-1}$) and Acid-lead (which may go from 30 to 35 Wh·kg$^{1}$). What is more, Li-ion accumulators may have a nominal cell voltage greater than that of other accumulators (for example, a nominal voltage of approximately 3.6 V for a cell implementing the $LiCoO_2$/graphite pair as electrode material versus a nominal voltage of approximately 1.5 V for the other aforementioned accumulators).

Due to their intrinsic properties, Li-ion accumulators have therefore proven particularly interesting for fields where autonomy is a crucial criterion, as is the case in the fields of computers, video, telephones, transportation, such as electric and hybrid vehicles, or the medical, spatial, microelectronics fields. However, the performance of lithium-ion accumulators technology is reaching its limits today.

Currently, a new lithium-based accumulator technology is being presented as a promising alternative, this technology being the lithium/sulfur technology, in which the positive electrode comprises, as active material, elementary sulfur or a derivative of sulfur, such as lithium sulfide or lithium polysulfide.

The use of sulfur as active material for a positive electrode is particularly attractive, since sulfur has a very high theoretical specific capacity that may be up to 10 times greater than that obtained for conventional positive electrode materials (approximately 1675 mAh/g instead of 140 mAh/g for $LiCoO_2$). What is more, sulfur is abundantly present on the planet and is therefore characterized by low costs. Lastly, it has a low toxicity. All of these qualities contribute to making it particularly attractive for large-scale use, in particular for electric vehicles, especially given that lithium/sulfur accumulators may make it possible to reach specific energy densities from 300 to 600 Wh·g$^{-1}$.

From a structural perspective, a lithium/sulfur accumulator battery comprises at least one electrochemical cell including two electrodes based on different materials (a positive electrode comprising elementary sulfur as active material and a negative electrode comprising metal lithium as active material), between which an electrolyte is arranged.

More specifically, the positive electrode is traditionally made from a composite material comprising elementary sulfur and non-electroactive additives, such as an electronic conductive additive used to improve the electronic conductivity of the electrode and a binder, for example, a polymer binder to provide the cohesion between the different components of the composite material.

From a functional perspective, the reaction at the origin of the production of current (i.e., when the accumulator is in discharge mode) involves an oxidation reaction of the lithium at the negative electrode that produces electrons, which will power the outside circuit to which the positive and negative electrodes are connected, and a reduction reaction of the sulfur at the positive electrode.

Thus, explicitly, in the discharge process, the overall reaction is as follows:

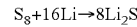

$$S_8 + 16Li \rightarrow 8Li_2S$$

which is the sum of the reduction reaction of the sulfur at the positive electrode ($S_8 + 16e^- \rightarrow 8S^{2-}$) and the oxidation reaction of the lithium at the negative electrode ($Li \rightarrow Li^+ + e^-$).

It is understood that the reverse electrochemical reactions occur during the charging process.

As emerges from the equation above, the reaction involves the exchange of 16 electrons, which justifies the high specific capacity of the sulfur (1675 mAh·g$^{-1}$).

From a mechanistic perspective, and without being bound by the theory, in the initial state (i.e., when the battery is in the fully charged state), the active material, which is elementary sulfur, is present in solid state in the positive electrode. During the reduction of sulfur, i.e., during the discharge, the cyclical molecules of sulfur are reduced and form linear chains of lithium polysulfide, with general formula $Li_2S_n$, with n being able to go from 2 to 8. Since the starting molecule is $S_8$, the first compounds formed are the long-chain lithium polysulfides, such as $Li_2S_8$ or $Li_2S_6$. These lithium polysulfides being soluble in the organic electrolytes, the first discharge step therefore consists of solubilizing the active material in the electrolyte, and producing long-chain lithium polysulfides in solution. As the sulfur reduction continues, the chain length of the polysulfides is gradually reduced, and compounds such as $Li_2S_5$, $Li_2S_4$ or $Li_2S_2$ are formed in solution. Lastly, the final reduction product is lithium sulfide ($Li_2S$), which is insoluble in the organic electrolytes. Thus, the final step of the sulfur reduction mechanism consists of the precipitation of the sulfurated active material.

This mechanism may be correlated to the discharge profile illustrated in FIG. 1, which shows a graph illustrating the evolution of the potential E (in V) as a function of the capacity C (in u.a.).

Indeed, in this profile, the first plateau may be attributed to the formation of long lithium polysulfide chains, while the second plateau corresponds to the reduction of the size of the sulfurated chains, until passivation of the positive electrode. Indeed, the compound at the end of discharging $Li_2S$, like the elementary sulfur, are insulating materials which, when they precipitated at the end of charging or discharging, drastically increase the resistance of the accumulator, and therefore its polarization.

This atypical operation causes many difficulties, which may hinder the large-scale marketing of lithium/sulfur accumulators. In particular, the insulating nature of the active material requires that it be associated with an electronic conductor having a sufficient developed surface to accommodate all of the active material and delay passivation of the electrode. It has in fact been possible to demonstrate that the discharge capacity is greatly related to the specific positive electrode surface accessible to the soluble and insoluble sulfurated species. To that end, positive electrodes have been proposed having a large specific surface, as described in FR 2,979,755, which in particular proposes positive electrodes including a porous electronic conductive substrate, in particular, this substrate being able to assume the form of a metal or carbonaceous foam, the porous structure making it possible to receive a large quantity of sulfurated species at the end of charging and discharging, which makes it possible to improve the discharge capacity. Furthermore, in FR 2,979,755, the active material of the positive electrode is introduced into the electrolyte in the form of lithium polysulfide (which thus constitutes a catholyte), which does not require the preparation of a composite positive electrode, as traditionally used in the lithium-based accumulators, i.e., with a current collecting substrate on which an ink is generally deposited comprising the active material, a binder, for example, polymeric, and an electronic conductive additive. Not using a composite positive electrode makes it possible to avoid a decrease in the capacity during cycles. Indeed, in the context of lithium-sulfur batteries, the successive dissolution and precipitation cycles of the active material at the positive electrode impose significant mechanical stresses thereon. As a result, the morphology of composite electrodes may therefore change substantially upon each cycle, which creates a loss of specific surface, and a concomitant loss of practical discharge capacity.

In light of what exists, the authors of the present invention have proposed to develop a new type of lithium-sulfur positive electrode that has a large specific surface, and furthermore offers good accessibility of its surface to the active material and the electrolyte.

BRIEF DESCRIPTION OF THE INVENTION

Thus, the invention relates to a positive electrode for a lithium-sulfur electrochemical accumulator comprising an electrically conductive substrate selectively coated, over at least one of its faces, with carbon nanotubes so as to create a zone coated with carbon nanotubes within which a plurality of separate zones without carbon nanotubes are arranged, these separate zones being qualified as empty.

In other words, the electrode may include an electrically conductive substrate including, over at least one of its faces, a zone coated with carbon nanotubes, within which a plurality of separate zones free of carbon nanotubes are arranged (these separate zones being qualified as empty).

The carbon nanotubes are preferably perpendicular to the surface of the substrate.

For example, the electrically conductive substrate may be coated over at least two of its faces, for example, on two opposite faces, in the manner explained above, i.e., selectively with carbon nanotubes so as to create, on each of said faces, a zone coated with said carbon nanotubes, said substrate further including, on said aforementioned faces, several separate zones without carbon nanotubes, said to be empty, arranged within the zone coated with carbon nanotubes.

Owing to this specific structure, the positive electrodes of the invention have the following advantages:
  a large specific surface due to the use of carbon nanotubes;
  a high accessibility of the surface of the electrode for the active material owing to the presence of zones without carbon nanotubes, which serve as circulation zone(s) (or more specifically, percolation passageways) for the active material to the base of the nanotubes, which makes it possible to increase the quantity of active material usable in the positive electrode and to thereby improve the discharge capacity of the accumulator in which the positive electrode will be accumulated.

What is more, the positive electrode does not contain binder, or additional electronic conductor, which makes it possible to avoid the drawbacks of the composite electrodes of the prior art, in particular the problems of structural collapse, disintegration of the electrode, and consequently, the problems of loss of specific surface able to receive the deposit of active material.

The positive electrode may adopt different geometries, inasmuch as it adheres to the definition given above.

More specifically, the positive electrode may include an electrically conductive substrate coated, over at least one of its faces, with a carpet of carbon nanotubes (which makes up the zone coated with carbon nanotubes) including several empty spaces, which for example are circular (these empty spaces making up the aforementioned separate zones).

Such a configuration is shown in the appended FIG. 2, illustrating a positive electrode 1 including an electrically conductive substrate 3 coated with a carpet of carbon nanotubes 5 including four circular empty spaces 7 with no carbon nanotubes.

These empty spaces, whether for the general definition of the first configuration or the more specific definition provided above, may have a larger distance greater than 10 nm, this larger distance corresponding to the maximum separation between two points defining the contour of the empty space considered in the plane of the substrate. When the empty spaces are circular, this larger distance corresponds to the diameters of these empty spaces.

As mentioned above, this larger distance is greater than 10 nm, for example, from 10 nm to 100 μm or from 50 nm to 100 μm, or from 10 μm to 100 μm, and still more specifically, from 1 μm to 20 μm.

The empty spaces may be arranged periodically on the surface of the substrate.

Preferably, the minimum distance between two adjacent empty spaces (i.e., the minimum separation between two points defining the contour of each of the empty spaces) may go from 20 nm to 200 µm, more specifically from 100 nm to 200 µm, still more specifically from 20 µm to 200 µm, and even more specifically and preferably, from 50 µm to 100 µm.

The substrate coated with carbon nanotubes according to the invention may have an opening rate from 0.001% to 50%, preferably below 25%, also preferably below 10%, and still more preferably below 1%.

It is specified that an opening rate refers to the ratio (surface occupied by the empty spaces on the face of the current collecting substrate including a zone coated with carbon nanotubes, within which said empty spaces are arranged)/(total surface of said zone coated with carbon nanotubes).

As an example, the positive electrode may consist of an electrically conductive substrate, assuming the form of an aluminum sheet, the substrate being coated with a carpet of carbon nanotubes having circular empty spaces with a diameter of 30 µm arranged such that the distance between the center of two adjacent empty spaces is 40 µm.

Irrespective of the configuration of the positive electrode, the carbon nanotubes may have a height from 1 µm to 1 mm.

The electrically conductive substrate may comprise a metal or carbonaceous material, for example in the form of a plate or sheet, such as aluminum, nickel, stainless steel.

According to another alternative, the electrically conductive substrate may be a gate, for example a metal gate, the spaces of which are the empty spaces and the lines defining these empty spaces are the zones coated with carbon nanotubes. The distance between the two aforementioned adjacent lines may be comprised between 50 nm and 200 µm, preferably between 10 µm and 200 µm. The width of such a line may be comprised between 50 nm and 200 µm, preferably between 10 µm and 200 µm. In this way, the anticipated presence of empty spaces in the substrate may simplify the localized deposition of the catalyst necessary for the growth of carbon nanotubes, for example, by chemical vapor deposition.

Independently of the configuration of the positive electrode, the main point is for the latter to have, on the surface of one of the faces of the substrate, zones without carbon nanotubes, which will be able to constitute circulation passageways (and percolation passageways) to bring active species to the anchoring points of the nanotubes, when they are brought in liquid solution into contact with the positive electrode, which makes it possible to increase the quantity of species in contact with the positive electrode, since the entire surface contributed by the carbon nanotubes is made accessible to the species owing to a specific structuring of the electrodes according to the invention.

Aside from the aforementioned elements, the positive electrode may include, before its incorporation into an accumulator, a sulfurated active material deposited on the face coated with carbon nanotubes, this active material being able to be elementary sulfur, lithium disulfide $Li_2S$ or lithium polysulfides $Li_2S_n$, with n being an integer from 2 to 8.

A sulfurated active material may be brought into contact with the positive electrode after its incorporation into an accumulator via the electrolyte comprising lithium polysulfides (this electrolyte then being able to be qualified as catholyte).

As mentioned above, the positive electrodes of the invention are intended to be included in the composition of electrochemical accumulators of the lithium-sulfur type.

The invention thus also relates to an electrochemical accumulator of the lithium-sulfur type comprising at least one electrochemical cell that comprises:
a positive electrode as defined above;
a negative electrode; and
an electrolyte conducting lithium ions arranged between said positive electrode and said negative electrode.

We wish to provide the following definitions.

A positive electrode traditionally refers, in the preceding and following, to the electrode that serves as cathode when the generator is withdrawing current (i.e., when it is in the discharging process) and that serves as an anode when the generator is in the charging process.

A negative electrode traditionally refers, in the preceding and following, to the electrode that serves as anode when the generator is withdrawing current (i.e., when it is in the discharging process) and that serves as cathode when the generator is in the charging process.

The negative electrode may preferably comprise a current collecting substrate on which at least the active material of the negative electrode is placed, this active material advantageously being able to be metal lithium.

The current collecting substrate may be made from a metal material (made up of a single metal element or an alloy of a metal element with another element), for example assuming the form of a plate or sheet, one specific example of a current collecting substrate being able to be a stainless steel or copper plate.

The electrolyte is an electrolyte conducting lithium ions, this electrolyte being able in particular to be a liquid electrolyte comprising at least one organic solvent and at least one lithium salt.

The organic solvent(s) may be an aprotic polar solvent in particular chosen from among the carbonate solvents, and in particular cyclic carbonate solvents, linear carbonate solvents and mixtures thereof.

Examples of cyclic carbonate solvents include ethylene carbonate (EC), propylene carbonate (PC).

Examples of linear carbonate solvents include dimethyl carbonate or diethyl carbonate (DEC), dimethyl carbonate (DMC), ethyl methyl carbonate (EMC).

The organic solvent(s) may be also chosen from among ether solvents, such as 1,3-dioxolane (DIOX), tetrahydrofurane (THF), le 1,2-dimethoxyethane (DME), or an ether with general formula $CH_3O-[CH_2CH_2O]_n-OCH_3$ (n being an integer from 1 to 10), such as tetraethyleneglycol dimethyl ether (TEGDME) and mixtures thereof.

Preferably, the organic solvent is an ether solvent or a mixture of ether solvents.

The lithium salt may be chosen from the group made up of $LiPF_6$, $LiClO_4$, $LiBF_4$, $LiAsF_6$, LiI, $LiNO_3$ $LiCF_3SO_3$, $LiN(CF_3SO_2)_2$ (also called lithium bis[(trifluoromethyl)sulfonyl]imide, LiTFSI), $LiN(C_2F_5SO_2)_2$ (also called lithium bis[(perfluoroethyl)sulfonyl]imide, LiBETI), $LiCH_3SO_3$, $LiB(C_2O_4)_2$ (also called lithium bis(oxalato)borate, LiBOB) and mixtures thereof, preference being given to a LiTFSI/$LiNO_3$ mixture.

The lithium salt may be present in the electrolyte with a concentration from 0.3 M to 2 M, for example 1 M.

Furthermore, the electrolyte may comprise at least one lithium polysulfides compound with formula $Li_2S$, with n being an integer from 2 to 8.

This compound thus constitutes the sulfur source for the active material of the positive electrode.

In this case, the quantity of lithium polysulfide compound introduced into the electrolyte is adapted based on the specific surface of the positive electrode, the latter dictating the quantity of active material that it is possible to deposit on the positive electrode.

The lithium polysulfide compound may be manufactured prior to the introduction into the electrolyte by mixing metal lithium and elementary sulfur in the proper proportions and in a solvent compatible with that or those comprised in the electrolyte.

The electrolyte, when it comprises at least one lithium polysulfide compound as defined above, may be qualified as "catholyte".

In the lithium battery, the aforementioned liquid electrolyte may be made, in the electrochemical cells of the lithium batteries, to impregnate a separator, which is arranged between the positive electrode and the negative electrode of the electrochemical cell.

This separator may be made from a porous material, such as a polymeric material, able to receive the liquid electrolyte in its pores, or may be a gelled polymer.

The electrochemical lithium accumulator may adopt different configurations, such as a button cell configuration or a cell configuration where the electrochemical cell(s) assume the form of a flexible pouch, or a configuration where the accumulator has a stack of electrochemical cells. It is understood that the dimensions of the positive electrode according to the invention will be adjusted, so that they are compatible with the configuration of the accumulator.

The accumulators according to the invention are particularly adapted to products requiring compact integration architectures (such as in onboard systems, autonomous systems), where significant energy is required. This type of requirement may be encountered in the fields of products requiring an autonomous power source, which is the case in the fields of computers, video, telephones, transportation, such as electric and hybrid vehicles, or the medical, spatial, microelectronics fields.

Aside from the positive electrode and the electrochemical accumulator comprising it according to the invention, the invention also relates to a method for preparing the positive electrode.

Thus, the invention relates to a method for preparing a positive electrode for a lithium-sulfur accumulator comprising an electrically conductive substrate selectively coated, over at least one of its faces, with carbon nanotubes so as to create a zone coated with said carbon nanotubes within which a plurality of separate zones without carbon nanotubes are arranged, these separate zones being qualified as empty, said method comprising a step for growing carbon nanotubes, selectively, on at least one of the faces of an electrically conductive substrate via a zone coated with a layer of at least one carbon nanotube growth catalyst.

It is understood that the zone coated with at least one carbon nanotube growth catalyst will correspond, after growth of said carbon nanotubes, to the zone coated with said carbon nanotubes in the positive electrode.

The carbon nanotube growth catalyst may for example be iron, cobalt, nickel.

The growth step may be carried out by chemical vapor deposition by circulating, on the substrate defined above, at least one carbonaceous gas precursor (such as $C_2H_2$ acetylene, $C_2H_4$ ethylene) in a reducing medium (for example, in the presence of hydrogen).

Prior to the carbon nanotube growth step, the method according to the invention may comprise a step for preparing the electrically conductive substrate selectively including, on at least one of its faces, a zone coated with a layer of at least one carbon nanotube growth catalyst.

This preparation step may be carried out by completely coating at least one face of an electrically conductive substrate with a layer of at least one carbon nanotube growth catalyst followed by an ablation (for example, laser ablation) of part of that layer, so as to allow only a zone selectively coated with a layer of at least one carbon nanotube growth catalyst to remain, while the ablated zones correspond to the zones not coated with a layer of catalyst (said zones will thus correspond to the zones of the positive electrode not coated with carbon nanotubes, which are the empty spaces). The laser ablation technique may make it possible to obtain zones not coated with a layer of catalyst having a larger size (more specifically, a diameter, when the zones are circular) from 10 µm to 100 µm.

This preparation step may be carried out by selectively covering only the zone intended to be coated with carbon nanotubes with a layer of catalyst, this being able to be obtained either by protecting the substrate with a mechanical mask during the deposition of the catalyst, or by using lithography techniques, such as photolithography, by using a photosensitive resin (such as a block copolymer). The lithography technique may make it possible to obtain zones not coated with a layer of catalyst having a larger size (more specifically, a diameter, when the zones are circular) from 10 nm to 10 µm.

The preparation step may also be carried out by depositing, on at least one face of the electrically conductive substrate, beads or objects (for example with sizes corresponding to the size of the empty spaces one wishes to obtain) followed by a catalyst deposition (using techniques similar to those defined above, the catalyst for example being able to be a layer of iron 1 nm thick deposited by PVD), then followed by the elimination of the deposited beads or objects, the place left vacant by this elimination thus constituting zones without catalyst. The beads can be abrasive beads (for example alumina, diamond) or calibrated glass beads. The aforementioned beads or objects may be deposited by spraying a water- and/or alcohol-based solution comprising them, the concentration of beads or objects being adjusted in this solution. Once the catalyst deposition is done, the beads or objects may be eliminated by blowing, by immersion in a solvent with or without ultrasounds, by laser scanning or by supercritical $CO_2$.

After the growth step of the carbon nanotubes, the method may comprise a step for deposition, on the surface of the positive electrode, of a sulfurated material, which may be elementary sulfur (the deposition step being able to consist of the impregnation of the positive electrode with elementary sulfur in liquid state (or molten state) or gaseous state (or sublimated state) or lithium disulfide $Li_2S$ (the deposition step being able to consist of a step for impregnation of the positive electrode with lithium disulfide).

Alternatively, the active material may be incorporated into the electrolyte in the form of lithium polysulfide.

The lithium-sulfur electrochemical accumulator according to the invention may be prepared using a method comprising, for each electrochemical cell, a step for placing a positive electrode and a negative electrode on either side of an impregnating electrolyte, optionally a separator.

The invention will now be described in reference to the particular embodiments defined below in reference to the appended figures.

DETAILED DESCRIPTION OF THE INVENTION

EXAMPLE 1

The present example illustrates the preparation of a positive electrode according to the invention and an accumulator comprising such an electrode. To that end, two steps are carried out:

a step for preparing the positive electrode (step a) below);
a step for preparing the accumulator (step b below).

a) Preparation of the Positive Electrode

An aluminum sheet with a thickness of approximately 20 μm and a diameter of 14 mm is first carefully cleaned using an $O_2$ plasma cleaning method.

The sheet thus cleaned is next coated with a layer of iron (0.5 nm thick) by physical vapor deposition (PVD), this layer of iron being intended to form the catalyst for the carbon nanotube growth.

This layer of iron is partially removed by laser ablation on circular zones measuring 30 μm in diameter, the centers of which are spaced apart by 40 μm.

The sheet is next inserted into a chemical vapor deposition (CVD) chamber for the carbon nanotube growth. It is understood that only the zone coated with a layer of iron will host the growth of the carbon nanotubes (in other words, the circular zones will have no carbon nanotubes).

The CVD growth is done after cleaning via an air plasma ($O_2$:$N_2$ 20:80) under the following conditions:

Increase of the temperature of the reactor up to 600° C. in 15 min. under an atmosphere made up of $C_2H_2$ (5 sccm), $H_2$ (90 sccm) and He (110 sccm) for a total pressure of 0.9 Torr;
Maintenance of the aforementioned atmosphere at 600° C. for 1 hour; and
Cooling under helium.

Figure 1:
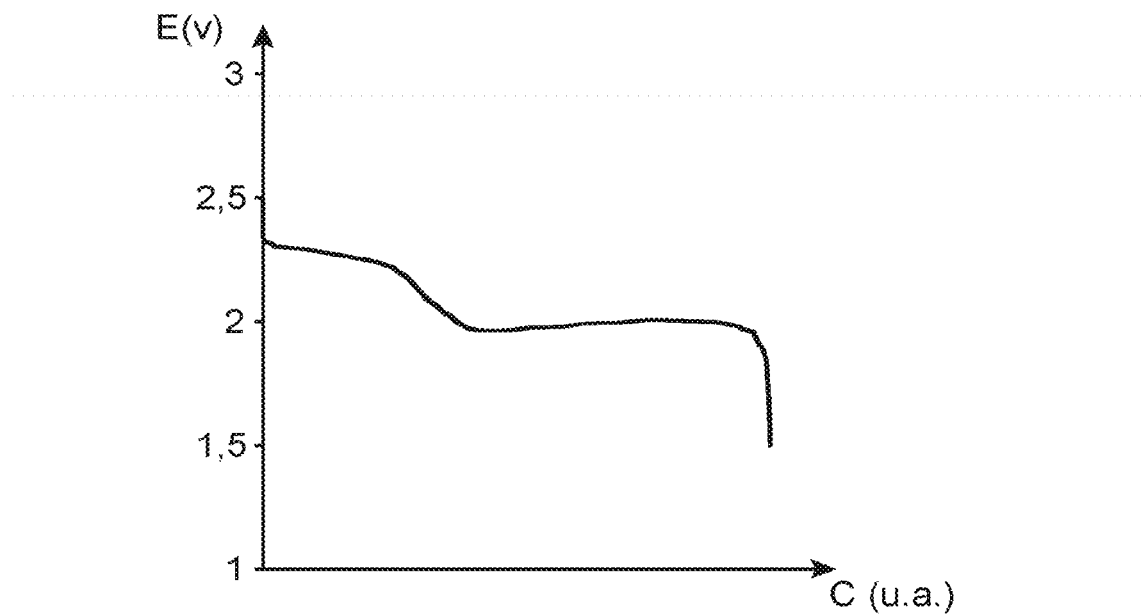
FIG. 1 is a graph illustrating the evolution of the potential E (in V) as a function of the capacity C (in u.a.).
Figure 2:
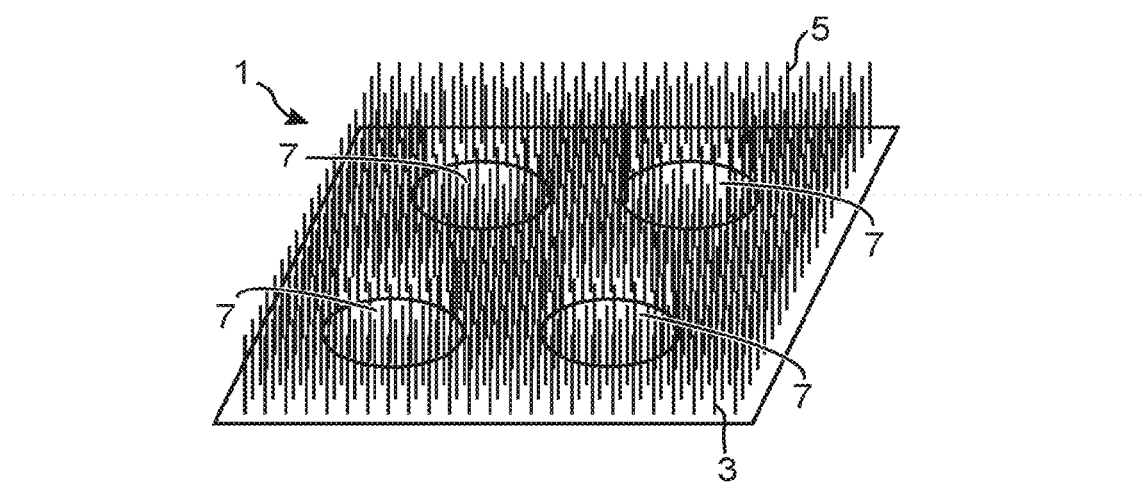
FIG. 2 is a top perspective view of a positive electrode according to the invention having a particular configuration.
Figure 3:
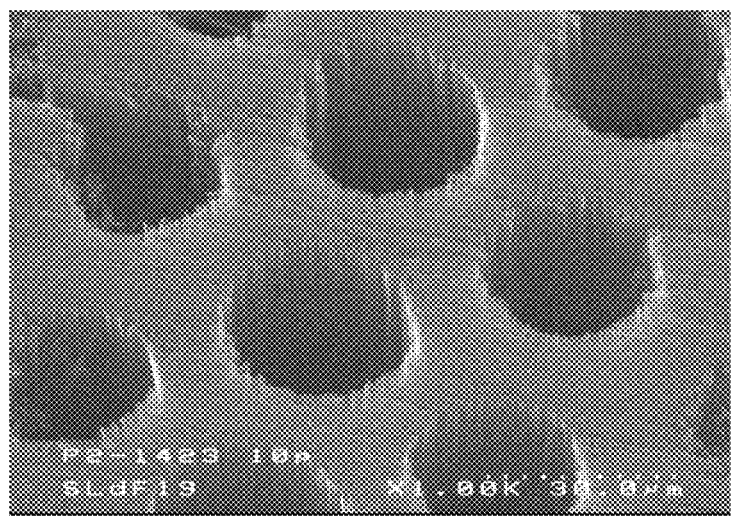
FIG. 3 is a photograph from above of the positive electrode obtained in example 1.

This results in a carpet of carbon nanotubes having a height from 50 to 60 μm having circular empty spaces (with dimensions corresponding to the dimensions of the aforementioned circular zones) distributed periodically on the surface of the sheet (as illustrated in FIG. 3, appended), thus forming the positive electrode.

As an alternative to the plasma-assisted CVD growth, the CVD growth may be done using tungsten filaments brought to a high temperature in the reactor.

The implementation conditions are then as follows:

the setpoint temperature of the reactor is lowered to 450° C.;
the composition of the gases is slightly modified: $C_2H_2$:$H_2$:He (20:50:110);
the power of the filaments is set at 500 W;
a growth time of 30 minutes is sufficient.

This results in a denser carpet of carbon nanotubes having a height of 140 μm.

b) Preparation of the Accumulator

The sulfurated active material of the positive electrode is brought in the form of a catholyte, which comprises the following ingredients:

1,3-dioxolane solvent (supplied by Aldrich) at a rate of 50 μL;
tetraethyleneglycol dimethylether solvent (supplied by Aldrich) at a rate of 50 μL;
lithium polysulfide $Li_2S_6$ at 0.25 M;
lithium bis(trifluoromethanesulfonyl)imide salt (LiTFSI) 1M; and
lithium nitrate salt $LiNO_3$ 0.1 M.

The accumulator is mounted in the form of a button cell (CR 2032), which respectively includes:

a circular positive electrode with a diameter of 14 mm obtained by cutting the sheet obtained in step a) explained above;
a metal lithium negative electrode, which consists of a disc 130 μm thick and 16 mm in diameter, this disc being deposited on a stainless steel disc serving as a current collector; and
a separator arranged between the positive electrode and the negative electrode imbibed with the catholyte defined above.

EXAMPLE 2

This example is similar to example 1, except that the accumulator is prepared differently, as described below.

To that end, a positive electrode is prepared by cutting out a disc with a diameter of 14 mm from a sheet partially covered with carbon nanotubes prepared according to the conditions of step a) of example 1 (obtained by plasma CVD).

The electrode thus obtained is pressed on a heating plate. The quantity of sulfur that one wishes to introduce into the accumulator (from 1 to 3 mg) is deposited in powder form on the electrode. The temperature of the heating plate is increased gradually, so as to melt the solid sulfur (the melting temperature being approximately 115° C.). Thus melted, the sulfur penetrates the pores of the carpet of carbon nanotubes by capillarity.

The positive electrode thus sulfurated is mounted in a button cell according to the same terms as stated in example 1, using an electrolyte comprising the following ingredients:

1,3-dioxolane solvent (supplied by Aldrich) at a rate of 50 μL;
tetraethyleneglycol dimethylether solvent (supplied by Aldrich) at a rate of 50 μL;
lithium bis(trifluoromethanesulfonyl)imide salt (LiTFSI) 1M; and
lithium nitrate salt $LiNO_3$ 0.1 M.

EXAMPLE 3

The present example illustrates the preparation of a positive electrode according to the invention and an accumulator comprising such an assembly. To that end, two steps are carried out:

a step for preparing the aforementioned assembly (step a) below);
a step for preparing the accumulator (step b below).

a) Preparation of the Positive Electrode

A sheet of aluminum according to that used in example 1 is cleaned according to the same conditions as defined in that example.

Next, a positive photoresist is spread on the aluminum sheet thus cleaned, then insulated using a mask with appropriate patterns, such that the insulation is effective over the entire surface of the resin, with the exception of circular zones measuring 20 to 30 μm in diameter, spaced apart by 40 µm. After development, a fine layer of iron (0.5 nm in diameter) is deposited by PVD on the entire surface of the sheet. A lift-off is done, in order to remove the rest of the resin and the iron deposited on that resin.

The growth of the carbon nanotubes is done in the same way as in example 1, with or without hot filaments depending on the desired carpet height.

b) Preparation of the Accumulator

The accumulator of this example is prepared according to the same conditions as in example 1.

EXAMPLE 4

The present example illustrates the preparation of a positive electrode according to the invention and an accumulator comprising such an assembly. To that end, two steps are carried out:
- a step for preparing the aforementioned positive electrode (step a) below);
- a step for preparing the accumulator (step b below).

a) Preparation of the Positive Electrode

A sheet of aluminum according to that used in example 1 is cleaned according to the same conditions as defined in that example.

A lithography technique using a copolymer as photoresist is implemented to produce a nanometric structuring of the carpet of carbon nanotubes.

To that end, a photosensitive di-block copolymer, polystyrene-b-poly(methyl methacrylate) (PS-b-PMMA, 104 kg·mol$^{-1}$) is deposited on the sheet by centrifugal coating to form a layer with a thickness of approximately 60 nm. The layer is annealed at 190° C. for 7 days, which makes it possible to obtain a phase separation between the PS and PMMA blocks of the copolymer, this phase separation taking the form of the formation of PS and PMMA domains consisting of blades approximately 50 nm wide oriented perpendicular to the sheet.

Next, the entire surface of the assembly is insulated. The PMMA is photosensitive and may then be removed by submerging the sample in an acetic acid bath. The cleaning may be completed by a short RIE (reactive ion etching) treatment, such that only the PS domains remain on the specimen. A fine layer of iron (0.5 nm thick) is deposited by PVD on the entire surface of the substrate. A lift-off is done, in order to remove the PS part of the resin and the iron deposited on that resin.

This technique makes it possible to create an array of discontinuous carbon nanotubes, having pores with the shape and size of the PS domains present during the deposition of the catalyst. These micro-porosities may be associated with meso-porosities through partial laser ablation of the catalyst, as explained in example 1.

The growth of the carbon nanotubes is done in the same way as in example 1, with or without hot filaments depending on the desired carpet height.

b) Preparation of the Accumulator

The accumulator of this example is prepared according to the same conditions as in example 1.

COMPARATIVE EXAMPLE 1

The present example illustrates the preparation of a positive electrode not according to the invention and an accumulator comprising such an electrode. To that end, two steps are carried out:
- a step for preparing the positive electrode (step a) below);
- a step for preparing the accumulator (step b below).

a) Preparation of the Positive Electrode

First, an ink is produced from the following ingredients:
- elementary sulfur (supplied by Aldrich) (80 wt %);
- carbon black (Super P®, supplied by Timcal) (10 wt %);
- a binder (polyvinylidene difluoride, supplied by Solvay) (10 wt %) placed in solution in N-methylpyrrolidone.

The ink is deposited by coating using a micrometric scraper on an aluminum sheet approximately 20 µm thick, 50 cm long and 20 cm wide.

The layer thus obtained is dried at 55° C. for 24 hours under air.

b) Preparation of the Accumulator

The accumulator is mounted in the form of a button cell (CR 2032), which respectively includes:
- a circular positive electrode with a diameter of 14 mm obtained by cutting the sheet obtained in step a) explained above;
- a metal lithium negative electrode, which consists of a disc 130 µm thick and 16 mm in diameter, this disc being deposited on a stainless steel disc serving as a current collector; and
- a separator arranged between the positive electrode and the negative electrode imbibed with an electrolyte comprising LiTFSI (1 mol·L$^{-1}$)+LiNO$_3$ (0.1 M) in a 50/50 mixture by volume of tetraethyleneglycol dimethyl ether and dioxolane.

COMPARATIVE EXAMPLE 2

The present example illustrates the preparation of a positive electrode not according to the invention and an accumulator comprising such an assembly. To that end, two steps are carried out:
- a step for preparing the positive electrode (step a) below); and
- a step for preparing the accumulator (step b below).

a) Preparation of the Positive Electrode

An aluminum sheet with a thickness of approximately 20 µm and a diameter of 14 mm is first carefully cleaned using an O$_2$ plasma cleaning method.

The sheet thus cleaned is next coated with a layer of iron (0.5 nm thick) by physical vapor deposition (PVD), this layer of iron being intended to form the catalyst for the carbon nanotube growth.

The sheet is next inserted into a chemical vapor deposition (CVD) chamber for the carbon nanotube growth.

The CVD growth is done using an air plasma (O$_2$:N$_2$ 20:80) under the following conditions:
- Increase of the temperature of the reactor up to 600° C. in 15 min. under an atmosphere made up of C$_2$H$_5$ (5 sccm), H$_2$ (90 sccm) and He (110 sccm) for a total pressure of 0.9 Torr;
- Maintenance of the aforementioned atmosphere at 600° C. for 1 hour; and
- Cooling under helium.

This results in a carpet of carbon nanotubes having a height from 50 to 60 µm and without empty spaces.

b) Preparation of the Accumulator

The sulfurated active material of the positive electrode is brought in the form of a catholyte, which comprises the following ingredients:
- 1,3-dioxolane solvent (supplied by Aldrich) at a rate of 50 µL;
- tetraethyleneglycol dimethylether solvent (supplied by Aldrich) at a rate of 50 µL;
- lithium polysulfide Li$_2$S$_6$ at 0.25 M;

lithium bis(trifluoromethanesulfonyl)imide salt (LiTFSI) 1M;

lithium nitrate salt LiNO$_3$ 0.1 M.

The accumulator is mounted in the form of a button cell (CR 2032), which respectively includes:
- a circular positive electrode with a diameter of 14 mm obtained by cutting the sheet obtained in step a) explained above;
- a metal lithium negative electrode consists of a disc 130 μm thick and 16 mm in diameter, this disc being deposited on a stainless steel disc serving as a current collector; and
- a separator arranged between the positive electrode and the negative electrode imbibed with the catholyte defined above.

This example was reiterated several times, modifying the height of the carbon nanotubes and measuring the specific capacity of the accumulator.

Figure 4:
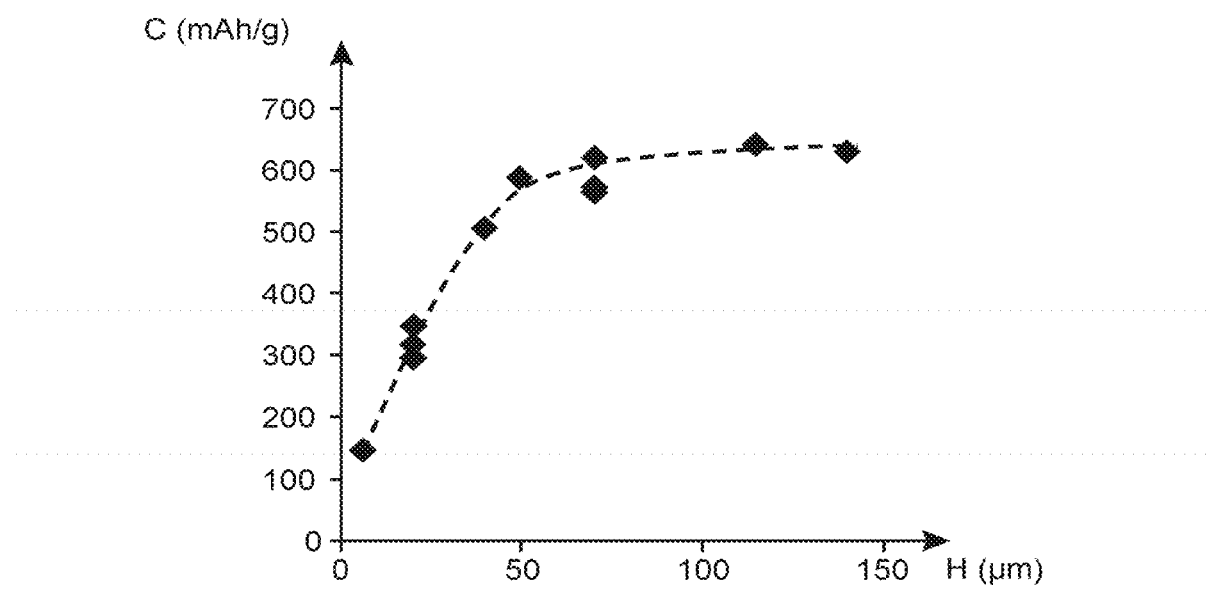
FIG. 4 is a graph illustrating the evolution of the specific capacity of the accumulator C (in mAh/g) as a function of the height of the carbon nanotubes H (in μm).

FIG. 4 is a graph illustrating the evolution of the specific capacity of the accumulator C (in mAh/g) as a function of the height of the carbon nanotubes H (in μm).

It is possible to see that the specific capacity increases with the height of the carpet of carbon nanotubes. Thus, a larger specific surface makes it possible to improve the use of the active material to a certain extent. Furthermore, the specific capacity of the accumulator is capped from a certain carpet height. Yet the achieved capacity (approximately 600 mAh/g) is still far from the theoretical capacity of 1675 mAh/g, which shows the problem of the accessibility of the surface offered by the carpet of carbon nanotubes, due to the absence of circulation zones with no carbon nanotubes.

The invention claimed is:

1. An electrochemical accumulator of the lithium-sulfur type comprising at least one electrochemical cell that comprises:
- a positive electrode comprising an electrically conductive substrate selectively coated, over at least one of its faces, with carbon nanotubes so as to create a zone coated with carbon nanotubes, which is a carpet of carbon nanotubes, within which a plurality of separate zones without carbon nanotubes are arranged, these separate zones being qualified as empty;
- a negative electrode; and
- an electrolyte conducting lithium ions arranged between said positive electrode and said negative electrode.

2. The electrochemical accumulator according to claim 1, wherein the electrically conductive substrate is selectively coated, over at least two of its faces, with carbon nanotubes so as to create, on each of said faces, a zone coated with said carbon nanotubes, which is a carpet of carbon nanotubes, within which a plurality of separate zones without carbon nanotubes are arranged, these separate zones being qualified as empty.

3. The electrochemical accumulator according to claim 1, wherein the carbon nanotubes are perpendicular to the surface of the substrate.

4. The electrochemical accumulator according to claim 1, wherein the empty spaces are circular empty spaces.

5. The electrochemical accumulator according to claim 1, wherein the empty spaces have a larger distance greater than 10 nm, the larger distance corresponding to the maximum separation between two points defining the contour of the empty space considered in the plane of the substrate, the larger distance corresponding to the diameters of these empty spaces, when these empty spaces are circular.

6. The electrochemical accumulator according to claim 5, wherein the larger distance ranges from 10 nm to 100 μm or from 50 nm to 100 μm, or more specifically, from 1 μm to 20 μm.

7. The electrochemical accumulator according to claim 1, wherein the minimum distance between two adjacent empty spaces ranges from 20 nm to 200 μm, more specifically from 100 nm to 200 μm, still more specifically from 20 μm to 200 μm, and even more specifically from 50 μm to 100 μm, the two adjacent empty spaces corresponding to the minimum separation between two points defining the contour of each of the empty spaces.

8. The electrochemical accumulator according to claim 1, wherein the electrically conductive substrate comprises a metal material, such as aluminum.

9. The electrochemical accumulator according to claim 1, which includes a sulfurated active material deposited on the face coated with carbon nanotubes, the active material being able to be elementary sulfur, lithium disulfide Li$_2$S or lithium polysulfides Li$_2$S$_n$, with n being an integer from 2 to 8.

10. The electrochemical accumulator according to claim 1, wherein the negative electrode comprises a current collecting substrate on which at least the active material of the negative electrode is placed, said active material being metal lithium.

11. The electrochemical accumulator according to claim 1, wherein the electrolyte conducting lithium ions is a liquid electrolyte comprising at least one organic solvent and at least one lithium salt.

12. The electrochemical accumulator according to claim 11, wherein the organic solvent(s) are chosen from among ether solvents.

13. The electrochemical accumulator according to claim 11, wherein the lithium salt is chosen from the group made up of LiPF$_6$, LiClO$_4$, LiBF$_4$, LiAsF$_6$, LiI, LiNO$_3$ LiCF$_3$SO$_3$, LiN(CF$_3$SO$_2$)$_2$ (also called lithium bis[(trifluoromethyl)sulfonyl]imide, LiTFSI), LiN(C$_2$F$_5$SO$_2$)$_2$ (also called lithium bis[perfluoroethyl)sulfonyl]imide, LiBETI), LiCH$_3$SO$_3$, LiB(C$_2$O$_4$)$_2$ (also called lithium bis(oxalato)borate, LiBOB) and mixtures thereof.

14. The electrochemical accumulator according to claim 1, wherein the electrolyte further comprises at least one lithium polysulfides compound with formula Li$_2$S$_n$ with n being an integer from 2 to 8.

* * * * *